(12) United States Patent
Hayashi

(10) Patent No.: US 6,604,255 B2
(45) Date of Patent: Aug. 12, 2003

(54) SOLDERING IRON CLEANING APPARATUS

(75) Inventor: Satoshi Hayashi, Komatsu (JP)

(73) Assignee: Komatsu Electronic Co., Ltd., Ishikawa-ken (JP)

( * ) Notice: Subject to any disclaimer, the term of this patent is extended or adjusted under 35 U.S.C. 154(b) by 93 days.

(21) Appl. No.: 09/927,508

(22) Filed: Aug. 13, 2001

(65) Prior Publication Data
US 2002/0042960 A1 Apr. 18, 2002

(30) Foreign Application Priority Data
Aug. 23, 2000 (JP) ........................................ 2000-253048

(51) Int. Cl.[7] ................................................. B08B 7/00
(52) U.S. Cl. .............................. 15/93.1; 15/77; 15/102; 15/104.04; 451/466
(58) Field of Search ........................... 15/77, 88, 88.2, 15/93.1, 102, 104.03, 104.04; 451/211, 271, 466

(56) References Cited

U.S. PATENT DOCUMENTS

| | | | | |
|---|---|---|---|---|
| 3,678,975 A | * | 7/1972 | Imanishi et al. | 144/28.5 |
| 3,746,061 A | * | 7/1973 | Nakazaki | 144/28.5 |
| 4,372,003 A | * | 2/1983 | Toelke | 15/88 |
| 4,394,785 A | * | 7/1983 | Vogler | 15/88.3 |
| 4,433,448 A | * | 2/1984 | True | 15/88 |
| 5,056,265 A | * | 10/1991 | Hurst | 451/69 |
| 6,470,929 B2 | * | 10/2002 | Fregeolle | 144/28.72 |

* cited by examiner

Primary Examiner—Terrence R. Till
(74) Attorney, Agent, or Firm—Nixon & Vanderhye P.C.

(57) ABSTRACT

This soldering iron cleaning apparatus comprises a main body having an introduction hole, a motor, a sensor mechanism which detects the insertion of the soldering head to the introduction hole and drives the motor, a cleaning member which removes solder remaining on the soldering head, a power transmission mechanism which drives the cleaning member by the driving force from the motor. The power transmission mechanism rotates the cleaning member, by the driving force of the motor, in such a way that the cleaning member scrapes the external surface of the soldering head from the base side to the tip side of the soldering head while turning the cleaning member around the soldering head.

4 Claims, 6 Drawing Sheets

SOLDERING IRON CLEANING APPARATUS

BACKGROUND OF THE INVENTION

1. Field of the Invention

The present invention relates to a soldering iron cleaning apparatus which removes the solder remaining on the soldering head in such a way that solder debris is ejected from the soldering head in one direction.

2. Description of Related Art

Various soldering iron cleaning apparatuses have been proposed, and some are in actual use, as devices which remove debris remaining on the soldering head of a soldering iron.

Conventional soldering iron cleaning apparatuses remove remaining solder by applying a force to the soldering head, for instance, using a removing member such as a brush.

In these conventional devices, a removing member, such as a brush, ejects hot molten debris in random directions, and it is desired that the entire removing process be completed inside the device from the view point of safety.

Although such a contained constitution successfully prevents the hot molten solder debris from spattering outwards, it inevitably causes a substantial shortening of the service life of the device because the adhesion of debris degrades the moving mechanisms inside the apparatus.

SUMMARY OF THE INVENTION

An object of the present invention is to provide a soldering iron cleaning apparatus which can remove solder from a soldering head of a soldering iron while preventing solder debris from adhering to the mechanical structures in the cleaning apparatus.

In order to achieve the object, the soldering iron cleaning apparatus of the present invention comprises: a main body having an introduction hole through which the soldering head of the soldering iron can be inserted; a motor; a sensor mechanism 54 which detects the insertion of the soldering head into the introduction hole and activates the motor; a cleaning member which removes solder remaining on the soldering head; and a power transmission mechanism which drives the cleaning member by the driving force of the motor. The power transmission mechanism rotates the cleaning member by the driving force of the motor in such a way that the cleaning member scrapes the external surface of the soldering head from the base side to the tip side of the soldering head while turning the cleaning member around the soldering head.

According to this apparatus, because the cleaning member scrapes the external surface of the soldering head from the base side to the tip side of the soldering head while turning around the soldering head, it is possible to spatter the soldering debris in the forward direction of the soldering head, and the adhesion of solder debris to the mechanical structures in the cleaning apparatus can thereby be prevented. Therefore, in comparison with a conventional cleaning apparatus which can spatter solder debris irregularly in all directions, it is possible to prolong the service life of the cleaning apparatus.

The power transmission mechanism may comprise: at least one planet gear which turns around the soldering head inserted into the introduction hole while rotating around its axis when it receives the driving force of the motor; a support member which is combined with the planet gear so as to turn around the soldering head together with the planet gear; a shaft which supports the cleaning member with respect to the support member so as to freely rotate around the shaft; and a second transmission mechanism which turns the cleaning member around the shaft by transmitting the rotational force of the planet gear to the cleaning member. The axis of the shaft is set perpendicular to the plane containing the turning axis of the support member.

In this case, it is possible to simplify the mechanical structure of the power transmission mechanism.

The cleaning member may comprise a flexible material which scrapes solder from the soldering head. This is more likely to optimize the conditions for removing the debris.

A plurality of the cleaning members may be radially fixed on the shaft, and each of the cleaning members may comprise a flexible material, with one end of each cleaning member being fixed to the shaft, and the other end scraping solder from the soldering head.

DETAILED DESCRIPTION OF THE INVENTION

Figure 1:
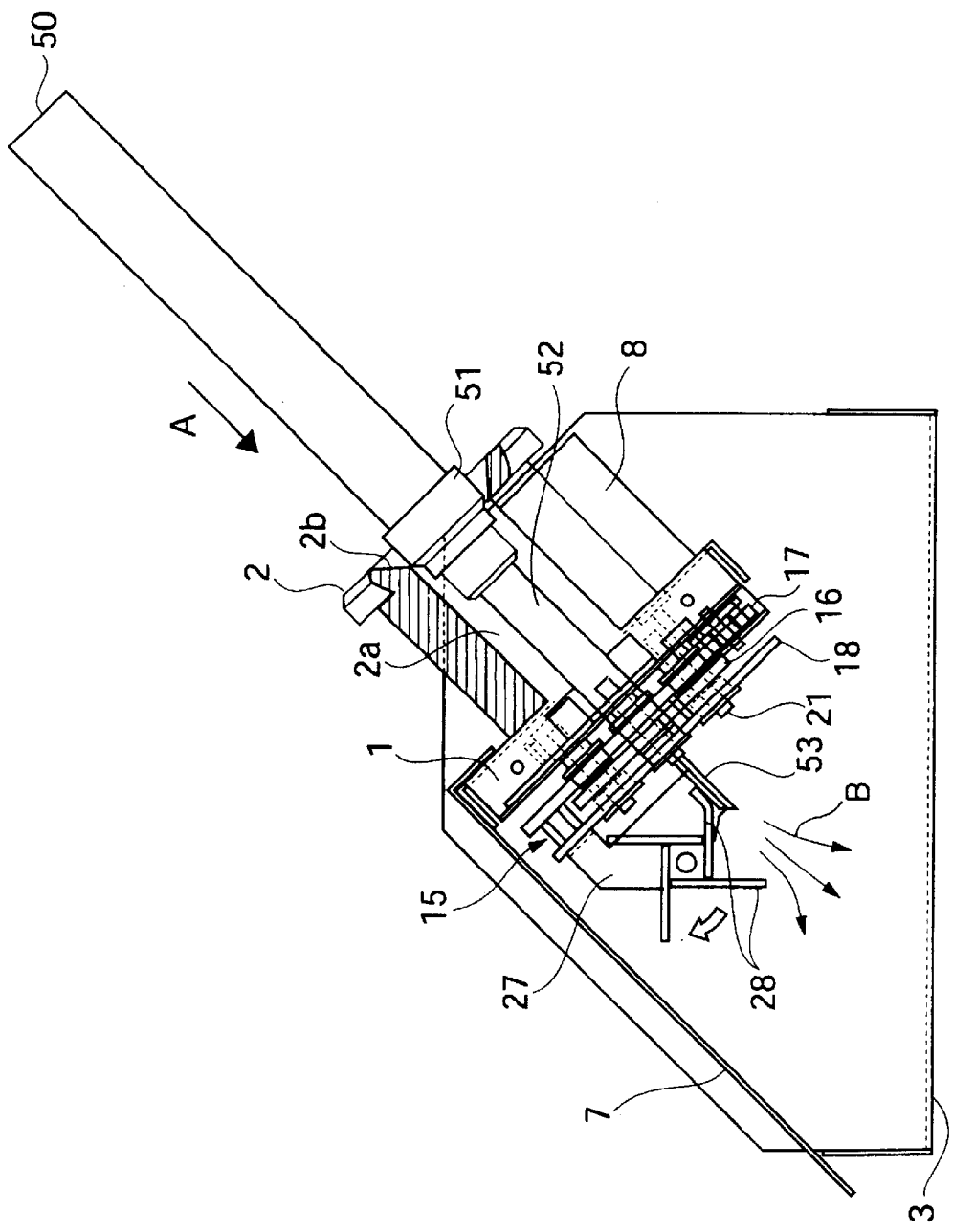
FIG. 1 is a cross section illustrating one embodiment of the soldering iron cleaning apparatus according to the present invention.

A preferred embodiment of the present invention will be explained with reference to the drawings. FIGS. 1 through 8 show an embodiment of the soldering iron cleaning apparatus of the present invention.

This soldering iron cleaning apparatus comprises a main body 1 having an introduction hole 1c into which a soldering head 53 of a soldering iron 50 can be inserted, a motor 8, sensor mechanism which detects the insertion of a soldering head 53 into the introduction hole 1c and drives the motor 8, a cleaning member 28 which removes the solder remaining on the soldering head 53, and a power transmission mechanism 15 which drives the cleaning member 28 by the driving force from the motor 8. The power transmission mechanism 15 rotates the cleaning member 28, with the driving force of the motor 8, in such a way that the cleaning member 28 scrapes the external surface of the soldering head 53 from the base side to the tip side of the soldering head 53 while turning the cleaning member 28 around the soldering head 53.

This soldering iron cleaning apparatus is constructed in such a way that when a soldering head 53 of soldering iron 50 is inserted (in the direction A in FIG. 1) into the introduction hole 1c to a predetermined position, the sensor mechanism 54 detects the insertion and automatically drives the motor 8 to provide a driving force, and cleaning member 28, which is driven by the motor 8, cleans the soldering head 53 of soldering iron 50, and debris remaining on the soldering head 53 of soldering iron 50 is thus spattered away from the soldering head in a direction along the axis of the soldering head.

Figure 2:
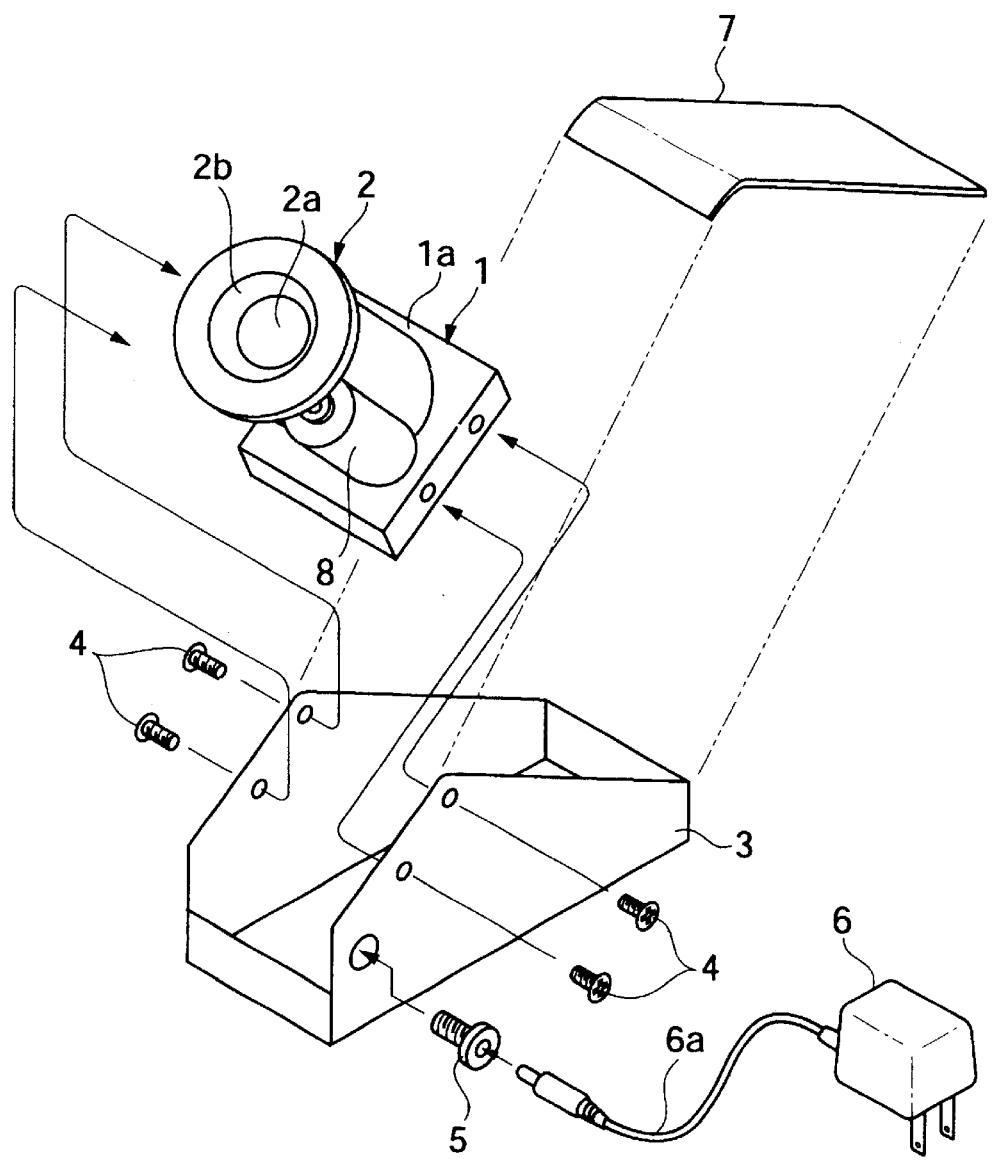
FIG. 2 is an exploded perspective view showing the assembly of the soldering iron cleaning apparatus.
Figure 3:
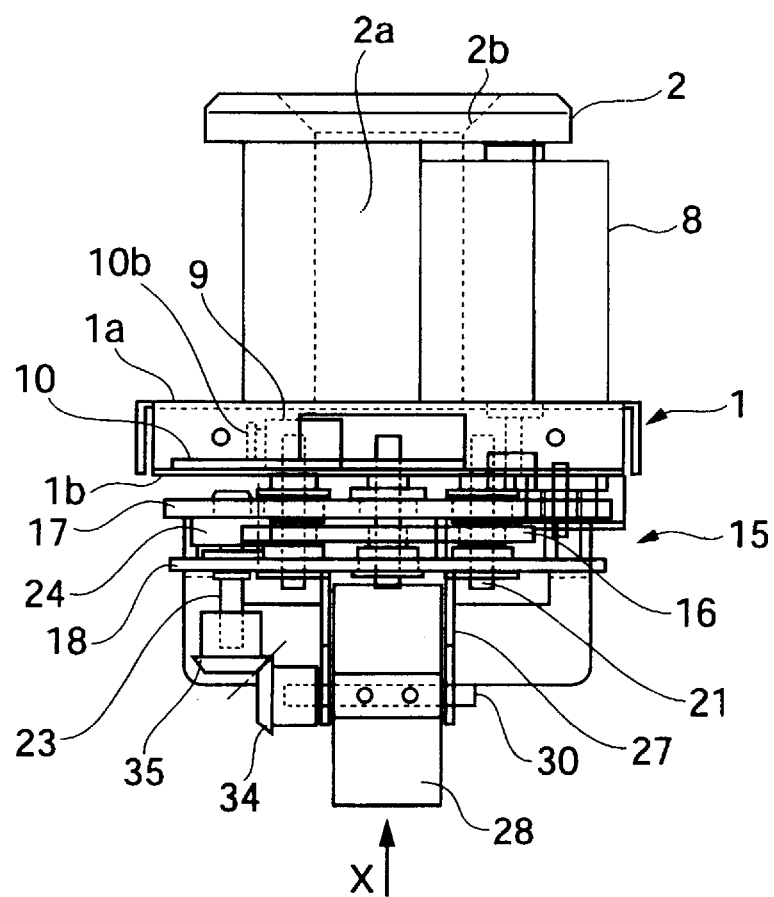
FIG. 3 is a view showing a partial cross section of a main part of the soldering iron cleaning apparatus.
Figure 4:
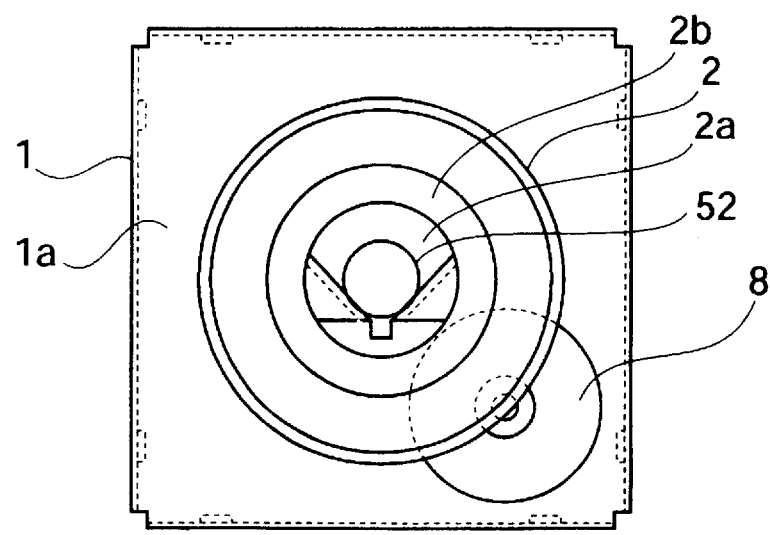
FIG. 4 is a front view from above (from the insertion side of a soldering iron) of the soldering iron cleaning apparatus.

In the main body 1, an introduction guide 2 is provided. As shown in FIGS. 1 through 3, the introduction guide 2 has a cylindrical shape, and is provided in the upper part of the main body 1 so as to form a through hole 2a for the insertion of the soldering head of the soldering iron 50. Around the upper entrance of the through hole 2a, a tapered part 2b is formed on the upper end of the introduction guide 2 in order to hold a collar part 51 of the soldering iron 50 in such a way that the soldering head 53 of the soldering iron 50 is securely positioned at a predetermined position in the through hole 2a.

The main body 1, as shown in FIGS. 1 through 4, is fixed by screws 4 in a casing 3 so that the through hole 2a is open in an upper inclined direction.

Figure 6:
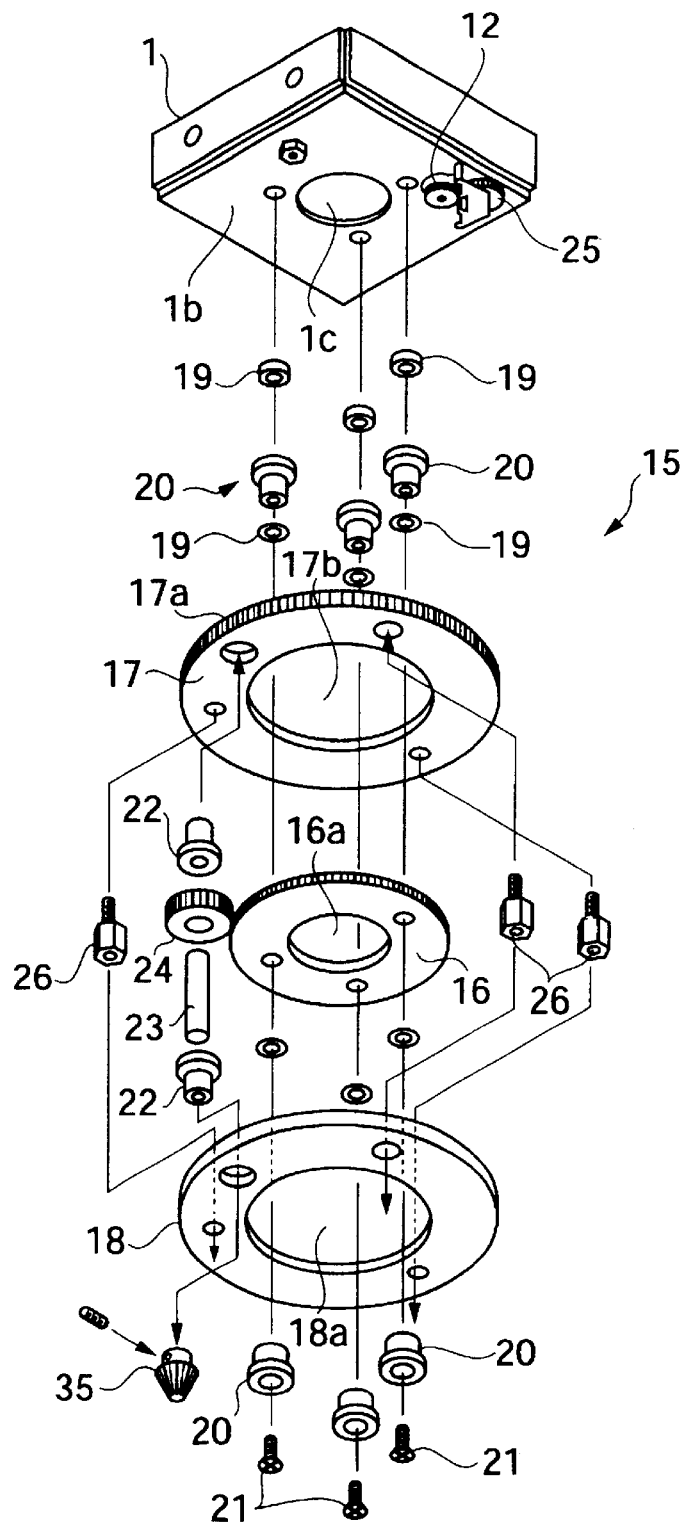
FIG. 6 is an exploded perspective view showing how the power transmission mechanism is assembled.

At the lower side of the casing 3, as shown in FIG. 2, an electric cord 6a of a power supply 6 is inserted from the outside via a bushing 5 and is connected to the switch unit 9 which is disposed in the main body 1. A rectangular cover 7 is fixed on the upper part of the casing 3, as shown in FIGS. 1 and 2. As shown in FIGS. 2 and 6, the main body 1 is a box shaped, and the introduction guide 2 and the motor 8 which provides the driving force are attached to the upper wall 1a of the main body 1. The power transmission mechanism 15 is attached to the bottom wall 1b of the main body 1.

Figure 5:
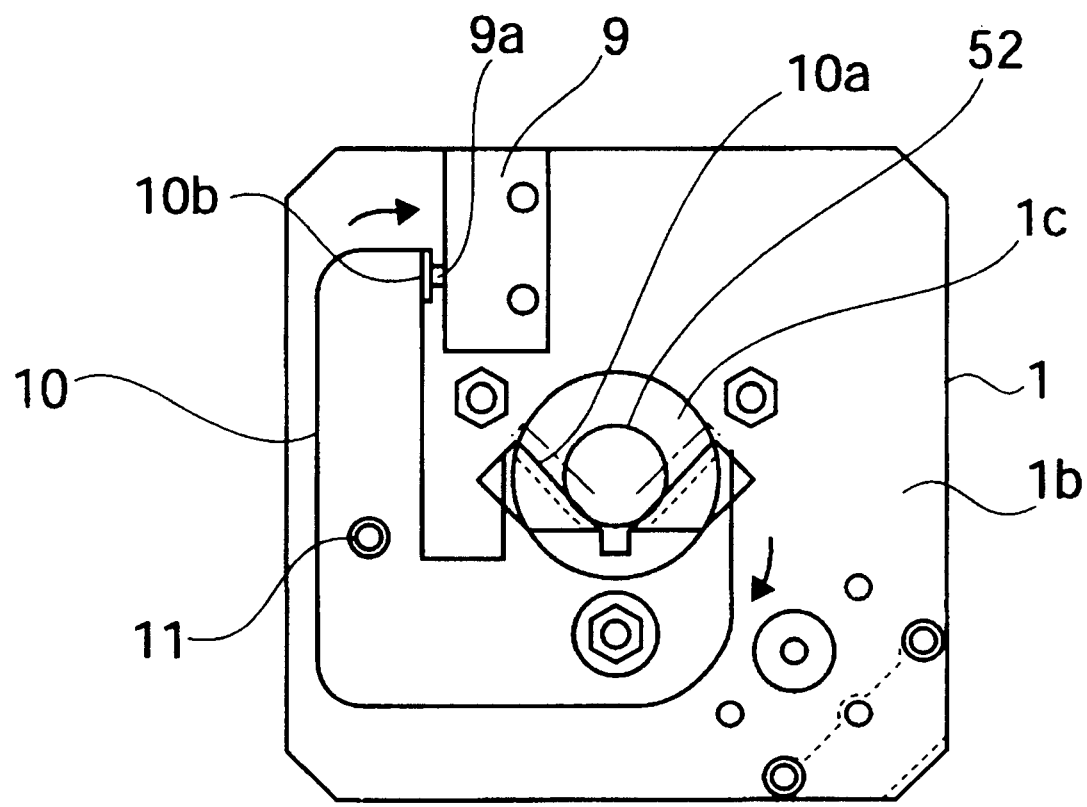
FIG. 5 is a front view of the sensor mechanism in the body of the soldering iron cleaning apparatus.

Furthermore, a sensor mechanism is disposed in the main body 1 for detecting the insertion of the soldering head into the introduction guide 2. The sensor mechanism comprises the switch unit 9 and a sensor level 10. The sensor level 10 is L shaped as shown in FIG. 5, and is attached to the bottom wall 1b of the main body 1 so as to be freely rotatable around the pivot 11. The sensor lever 10 has a V-shaped sensor part 10a formed at one end thereof, and a switch part 10b formed at the other end. The sensor lever 10 is, at first, positioned in such a way that the V-shaped sensor part 10 partially covers the openings of the introduction hole 1c along the bottom wall 1b. The switch part 10b is located in such a way that the switch part 10b directly faces a switch 9a provided in the switch unit 9.

When the soldering iron 50 is inserted through the introduction guide 2 into the apparatus, the contact of a handgrip 52 of the soldering iron 50 with the sensor lever 10 causes a clockwise rotational movement of the sensor lever 10, about the pivot 11, as shown in FIG. 5, and pushes the switch part 10b of the sensor lever 10 against the switch 9a of the switch unit 9. Consequently, the switch 9a is turned on and the motor 8 starts driving. In contrast, when the soldering iron 50 is withdrawn from the apparatus, the sensor lever 10 returns to the standby position with the aid of the recovery force of a spring (not shown in the drawing), the pressure on the switch 9a of the switch unit 9 is relieved, and thus the switch turns off and the motor 8 stops.

Figure 8:
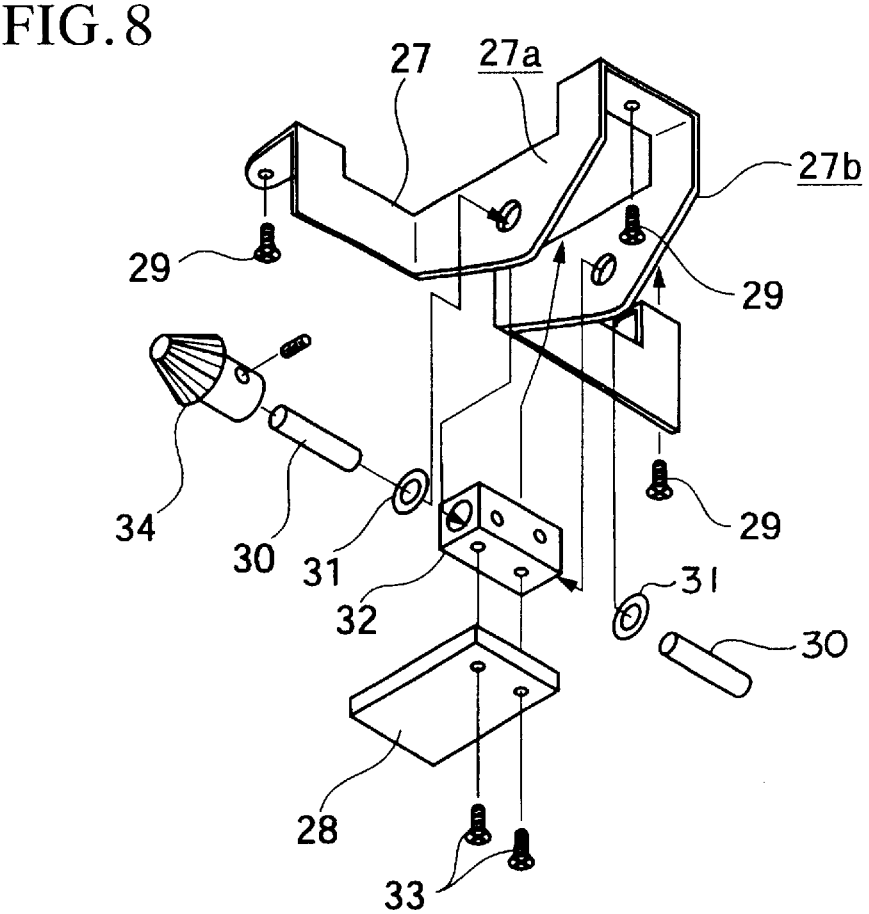
FIG. 8 is an exploded perspective view of a cleaner head casing.

The motor 8, for the purpose of driving the below-mentioned cleaning member 28, is located on the upper wall 1a in such a way that its output axis passes through the bottom wall 1b of the main body 1 as shown in FIG. 6. In addition, the top of the output axis is capped with a gear 12. The gear 12 is engaged with a ring gear 17 of the power transmission mechanism 15. The cleaning member 28, which removes the debris remaining on the soldering head 53 of the soldering iron 50, is made of a sheet of a flexible synthetic resin with a rectangular shape in this embodiment, as shown in FIG. 8. The assembly of the cleaning member 28 is described hereinafter.

On the other hand, the power transmission mechanism 15, as shown in FIGS. 1, 3, and 6, comprises a fixed gear 16, a ring gear 17, and a support ring 18. The fixed gear 16, as shown in FIG. 6, is suspended from the bottom wall 1b of the main body 1 via a plurality of spacers 19, a plurality of the bearings 20, and a plurality of bolts 21. The ring gear 17 is located between the bottom wall 1b of the main body 1 and the fixed gear 16, and gear part 17a of the ring gear 17 is engaged with the gear 12 which is fixed to the output axis of the motor 8. The radius of the support ring 18 is substantially the same as the ring gear 17, and the support ring 18 is connected to the ring gear 17. The support ring 18 is located beneath the fixed gear 16 by way of a flanged bushing 22 and a connecting shaft 23. Through holes 16a, 17b, and 18a are respectively formed at the center of the fixed gear 16, the ring gear 17, and the support ring 18, so that the handgrip 52 of the soldering iron 50 can pass therethrough. Furthermore, the planet gear 24 is mounted at the middle of the connecting shaft 23, and is engaged with the fixed gear 16, and a first bevel gear 35 is attached to the bottom part of the support ring 18 as shown in FIG. 3.

In the power transmission mechanism 15, when the gear 12 is driven by the motor 8, the ring gear 17 and the support ring 18 rotate about the center axis of the ring gear 17, and simultaneously, the planet gear 24 revolves around the fixed gear 16 while rotating about its own axis. The first bevel gear 35, in the same way as the planet gear 24, consequently revolves around the fixed gear 16 while rotating about its own axis. As shown in FIG. 6, an adjustive gear 25 is located on the bottom wall 1b of the main body 1 in order to adjust the engagement between the gear 12 and the ring gear 17. Three nut-head screws 26 connect the ring gear 17 and the support ring 18 in a parallel manner, and the nut-head screws 26 maintain the distance between the ring gear 17 and the support ring 18.

Figure 7:
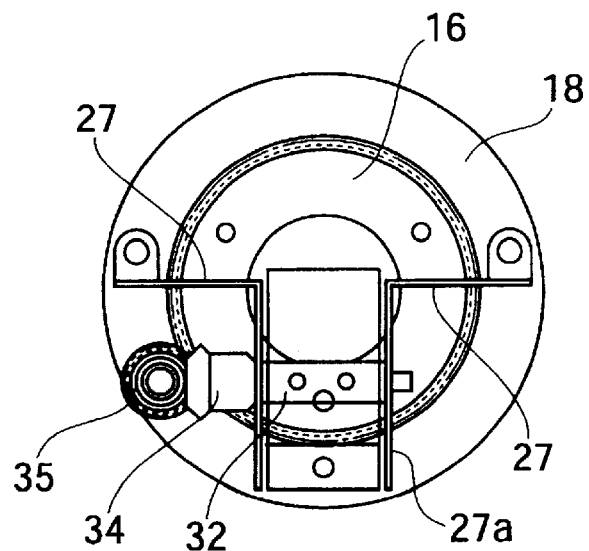
FIG. 7 is a front view, from the X-direction in FIG. 3, showing the assembled cleaning member.

The cleaner head casing 27 is attached to the bottom surface of the support ring 18 by three screws 29 screwed into the nut-head screws 26 through the support ring 18, as shown in FIG. 8. The cleaner head casing 27 is a support member for supporting the cleaning member 28 with respect to the support ring 18 at a predetermined position. The cleaner head casing 27 has a pair of L-shaped parts opposing each other as shown in FIGS. 7 and 8.

Cleaning member holder 32 is disposed between support walls 27a and 27b of the cleaning head casing 27, and is supported by a pair of shafts 30 inserted through the hole of the cleaning member holder 32 between the support walls 27a and 27b and spacers 31. The shafts 30 are arranged so that their axes are perpendicular to the rotation axis of the support ring 18.

As shown in FIG. 8, the cleaning member holder 32 is shaped like a column with a polygonal cross section, and a center through hole is formed in the cleaning member holder 32 so that the shafts 30 can be inserted therein. One end of each of four cleaning members 28 having a rectangular shape is fixed respectively onto each one of the four sides of the cleaning member holder 32 by screws 33. Although four cleaning members 28 are provided in the present embodiment, the number of the cleaning members 28 may be modified to one through three. The cleaning members 28 are preferably formed of an elastic material having superior heat-resistant properties such as silicone resins. However, the present invention is not limited to such a construction, and the cleaning member 28 may be formed of various materials.

At an end of one of the shafts 30, a second bevel gear 34 is fixed, and the second bevel gear 34 is engaged with the first bevel gear 35 on the support ring 18. Thus, when the ring gear 17 and the support ring 18 are rotated by the motor 8, the driving force of the first bevel gear 35 is transmitted to the second bevel gear 34. Accordingly, the cleaning members 28 rotate about the shafts 30, and the cleaning members 28 scrape the external surface of the soldering head 53 from the base side to the tip side thereof while turning around the soldering head 53.

Consequently, solder debris is spattered in the forward direction of the soldering head 53 (in the direction of arrows B in FIG. 1) by the scraping movement of the cleaning member 28 from the bottom part of the soldering head to the top end.

The soldering iron cleaning apparatus in this embodiment comprises the aforementioned structure, and its operation is described below. The power supply 6 is assumed to be connected to an electrical outlet (not shown). When the soldering iron 50 is inserted through the introduction guide 2 into the apparatus for the purpose of cleaning the soldering head of a soldering iron on which there is a residue of the solder, the handgrip 52 of the soldering iron 50 contacts the V-shaped sensor part 10a of the sensor lever 10. The sensor lever 10 rotates in the clockwise direction, as shown by the arrow in FIG. 5, about the pivot 11, and the switch part 10b of the sensor lever 10 accordingly pushes the switch 9a of the switch unit 9, and the apparatus is activated and the motor 8 is driven.

When the motor 8 starts driving, the gear 12, capped on the shaft of the motor 8, rotates. In addition, the ring gear 17 of the power transmission mechanism 15, which is engaged with the gear 12, rotates in unison with the support ring 18. This unified revolution is concentrically supported by a plurality of the bearings 20. Along with the rotation of the ring gear 17 and the support ring 18, the planet gear 24 revolves around the fixed gear 16 with its rotation about the connecting shaft 23.

When the planet gear 24 rotates about its center and revolves around the fixed gear 16, the second bevel gear 34, via the first bevel gear 35, rotates about its center and revolves around the circumference of the soldering head 53 of the soldering iron 50. The shaft 30 and the cleaning member holder 32 accordingly rotate about an axis perpendicular to the longitudinal direction of the soldering iron 50. As a result, along with the scraping movement against the soldering head 53 of the soldering iron 50 by the edge of the cleaning member 28, the cleaning member 28 revolves around the center of the soldering head 53 of the soldering iron 50, and also rotates about the insertion direction A (shown in FIG. 1) of a soldering iron 50. According to the aforementioned operation, debris (molten solder) remaining on the soldering iron 50 is ejected only in the forward direction of the soldering iron 50 (the direction of arrows B in FIG. 1) by the cleaning member 28. That is, the cleaning member 28 can brush off the solder which is adhered to the soldering head 53 of the soldering iron 50 in a predetermined direction inside the casing 3.

In the soldering iron cleaning apparatus in this embodiment, when removing the debris remaining on the soldering head 53 of the soldering iron 50, debris is directed only in the forward direction of the soldering iron 50, thus unfavorable cohesion of the solder with the mechanical parts inside the apparatus can be avoided. As a result, in comparison with a conventional apparatus which spatters debris in random directions, it is ensured that the service life of the apparatus is not shortened by the ejected debris. Additionally, the direction of the ejection of the debris is specified, so that easier disposal of the debris and improved maintenance can be achieved.

Furthermore, due to a constitution wherein the introduction guide 2 is in an inclined position, and due to the fact that the soldering iron 50 is cleaned in such a position, improved smoothness of the insertion and withdrawal of the soldering iron 50 and improved utility can be achieved.

The present invention is not limited to the above embodiment, and various modifications are possible. For example, other types of transmission mechanism can be employed instead the above-described mechanism. Furthermore, the material, shape, and size of the cleaning member 28 can be changed in accordance with the shape and size of the soldering head. For example, an arc shaped recess may be formed at the end of the cleaning members 28 in order to increase the contact area of the cleaning member with the soldering head.

What is claimed is:

1. A soldering iron cleaning apparatus which cleans a soldering head of a soldering iron, comprising:

a main body having an introduction hole through which the soldering head of the soldering iron can be inserted;

a motor;

a sensor mechanism which detects the insertion of the soldering head into the introduction hole and activates the motor;

a plurality of cleaning members which removes solder remaining on the soldering head;

a power transmission mechanism which drives a plurality of cleaning members by the driving force of the motor;

wherein the power transmission mechanism rotates a plurality of the cleaning members by the driving force of the motor in such a way that a plurality of the cleaning members scrapes the external surface of the soldering head from a base side to a tip side of the soldering head while revolving a plurality of the cleaning members around the soldering head.

2. A soldering iron cleaning apparatus which cleans a soldering head of a soldering iron, comprising:

a main body having an introduction hole through which the soldering head of the soldering iron can be inserted;

a motor;

a sensor mechanism which detects the insertion of the soldering head into the introduction hole and activates the motor;

a plurality of cleaning members which remove solder remaining on the soldering head;

a power transmission mechanism, which drives a plurality of cleaning members by the driving force of the motor, comprising at least one planet gear which revolves around the soldering head inserted into the introduction hole while rotating about its axis when receiving the driving force of the motor, a support member which is combined with the planet gear so as to revolve around the soldering head together with the planet gear, a shaft which supports a cleaning member holder in such a way that the cleaning member which freely rotates about the shaft; and a second transmission mechanism, which turns the cleaning member about the shaft by transmitting the rotational force of the planet gear to the cleaning member, in which the axis of the shaft is perpendicular to a plane containing the turning axis of the support member;

wherein the power transmission mechanism rotates a plurality of the cleaning members by the driving force of the motor in such a way that a plurality of the cleaning members scrape the external surface of the soldering head from a base side to a tip side of the soldering head while revolving a plurality of the cleaning members around the soldering head.

3. A soldering iron cleaning apparatus which cleans a soldering head of a soldering iron, comprising:

a main body having an introduction hole through which the soldering head of the soldering iron can be inserted;

a motor;

a sensor mechanism which detects the insertion of the soldering head into the introduction hole and activates the motor;

a plurality of cleaning members comprising a flexible material which scrapes solder remaining on the soldering head;

a power transmission mechanism which drives a plurality of cleaning members by the driving force of the motor;

wherein the power transmission mechanism rotates a plurality of the cleaning members by the driving force of the motor in such a way that a plurality of the cleaning members scrape the external surface of the soldering head from a base side to a tip side of the soldering head while revolving a plurality of the cleaning members around the soldering head.

4. A soldering iron cleaning apparatus which cleans a soldering head of a soldering iron, comprising:

a main body having an introduction hole through which the soldering head of the soldering iron can be inserted;

a motor;

a sensor mechanism which detects the insertion of the soldering head into the introduction hole and activates the motor;

a plurality of cleaning members which remove solder remaining on the soldering head, wherein the cleaning members are radially fixed on a shaft, each of the cleaning members comprises a flexible material one end of which is fixed to a cleaning member holder which is supported by the shaft, and the other end of which scrapes solder from the soldering head;

a power transmission mechanism which drives a plurality of cleaning members by the driving force of the motor, the power transmission mechanism comprising:

at least one planet gear which revolves around the soldering head inserted into the introduction hole while rotating about its axis when receiving the driving force of the motor;

a support member which is combined with the planet gear so as to revolve around the soldering head together with the planet gear;

a shaft which supports a cleaning member holder in such a way that the cleaning member which freely rotates about the shaft; and a second transmission mechanism, which turns the cleaning member about the shaft by transmitting the rotational force of the planet gear to the cleaning member, wherein the axis of the shaft is perpendicular to a plane containing the turning axis of the support member;

wherein the power transmission mechanism rotates a plurality of the cleaning members by the driving force of the motor in such a way that a plurality of the cleaning members scrape the external surface of the soldering head from a base side to a tip side of the soldering head while revolving a plurality of the cleaning members around the soldering head.

* * * * *